US010560491B2

(12) United States Patent
Wang et al.

(10) Patent No.: US 10,560,491 B2
(45) Date of Patent: Feb. 11, 2020

(54) METHODS AND APPARATUSES FOR BINDING WITH DEVICE

(71) Applicant: Xiaomi Inc., Beijing (CN)

(72) Inventors: Yuanbo Wang, Beijing (CN); Enxing Hou, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 178 days.

(21) Appl. No.: 15/012,310

(22) Filed: Feb. 1, 2016

(65) Prior Publication Data

US 2016/0234260 A1    Aug. 11, 2016

(51) Int. Cl.
*H04L 29/06* (2006.01)
*H04W 12/08* (2009.01)
*H04W 12/00* (2009.01)

(52) U.S. Cl.
CPC ........ *H04L 65/1069* (2013.01); *H04L 63/107* (2013.01); *H04L 65/1073* (2013.01); *H04L 69/16* (2013.01); *H04W 12/003* (2019.01); *H04W 12/08* (2013.01); *H04W 12/00503* (2019.01)

(58) Field of Classification Search
CPC .............. H04L 29/06; H04L 29/08981; H04L 29/08072; H04L 41/0806; G06F 9/4416
USPC ........................................................ 709/222
See application file for complete search history.

(56) References Cited

U.S. PATENT DOCUMENTS

| 2004/0082327 A1* | 4/2004 | Kim ..................... H04W 48/20 455/435.2 |
| 2005/0044227 A1 | 2/2005 | Haugh et al. |
| 2008/0222711 A1 | 9/2008 | Michaelis |

(Continued)

FOREIGN PATENT DOCUMENTS

| CN | 102264059 A | 11/2011 |
| CN | 103019197 A | 4/2013 |

(Continued)

OTHER PUBLICATIONS

International Search Report dated Feb. 22, 2016 in PCT/CN2015/093205 (with English Translation of categories of cited documents).

(Continued)

*Primary Examiner* — Mahran Y Abu Roumi
(74) *Attorney, Agent, or Firm* — Oblon, McClelland, Maier & Neustadt, L.L.P.

(57) ABSTRACT

The present disclosure provides a method for binding a user with a device. The method includes: a terminal sending a binding request to the device in a present local area network. The binding request carries a registered user ID for the user to log into a client program on the terminal. The method further includes: the device determining whether the binding request is sent from the present local area network. When the binding request is sent from the present local area network, the method includes the device sending the binding request to a server for the server to establish a binding relationship between the registered user ID and the device. After the binding relationship is established, the method includes the device receiving a notification message sent by the server for informing that the binding relationship has been established, and the device forwarding the notification message to the terminal.

11 Claims, 6 Drawing Sheets

(56) References Cited

U.S. PATENT DOCUMENTS

| | | |
|---|---|---|
| 2010/0030904 A1 | 2/2010 | Oda et al. |
| 2010/0125652 A1* | 5/2010 | Rantapuska ........ H04L 12/2818 709/222 |
| 2013/0039640 A1 | 2/2013 | Sekimoto |
| 2013/0182428 A1 | 7/2013 | Seehof |
| 2013/0185559 A1 | 7/2013 | Morel et al. |
| 2014/0040435 A1* | 2/2014 | Ylimartimo ........ H04L 12/2818 709/219 |
| 2014/0096180 A1 | 4/2014 | Negi et al. |
| 2014/0173049 A1* | 6/2014 | Baker ................. H04L 67/34 709/219 |
| 2014/0273957 A1 | 9/2014 | Reitz |

FOREIGN PATENT DOCUMENTS

| | | |
|---|---|---|
| CN | 103209183 A | 7/2013 |
| CN | 203324759 U | 12/2013 |
| CN | 103699409 A | 4/2014 |
| CN | 103019197 B | 10/2014 |
| CN | 104184668 A | 12/2014 |
| CN | 104202224 A | 12/2014 |
| CN | 104243482 A | 12/2014 |
| CN | 104270758 A | 1/2015 |
| CN | 104639549 A | 5/2015 |
| JP | 2005-258671 A | 9/2005 |
| JP | 2008-42262 A | 2/2008 |
| RU | 2010118403 A | 11/2011 |
| WO | WO 2008/103991 A2 | 8/2008 |

OTHER PUBLICATIONS

Combined Chinese Office Action and Search Report dated May 2, 2017 in Patent Application No. 201510061349.0.
International Search Report dated Feb. 22, 2016 in PCT/CN2015/093205 (Previously filed, submitting English Translation only).
Extended European Search Report dated Jun. 2, 2016 in Patent Application No. 16153946.5.
Japanese Office Action dated Feb. 21, 2017 in Patent Application No. 2016-572884.
Korean Office Action dated Mar. 16, 2017 in Patent Application No. 10-2015-7036561.
Russian Office Action dated Aug. 25, 2017 in Patent Application No. 2016116759 (with English Translation).
Decision on Grant dated Nov. 23, 2017 in Russian Patent Application No. 2016116759 (with English language translation).
Indian Patent Application No. 201617002356 dated Sep. 19, 2019.

* cited by examiner

METHODS AND APPARATUSES FOR BINDING WITH DEVICE

CROSS-REFERENCE TO RELATED APPLICATIONS

The present application is based upon and claims priority to Chinese Patent Application No. 201510061349.0, filed Feb. 5, 2015, the entire contents of which are incorporated herein by reference.

TECHNICAL FIELD

The present disclosure generally relates to the field of communication, and more particularly, to methods and apparatuses for binding with a device.

BACKGROUND

With the development of smart devices, in future, formation of a smart home will gradually become a focus of attention. However, since a smart device generally has a characteristic of opened interaction and operation, after a smart device is connected to the Internet, in theory, any device connected into the Internet can access and control the smart device. This poses a critical security risk.

In order to regulate a private property and a user for the smart device, a conventional method is to bind with the device and establish a binding relationship between the user and the smart device. Since only the bound user can have permission to access and control the smart device after the binding relationship is established, an extremely high security requirement has to be imposed to the process of establishing the binding relationship between the user and the smart device.

SUMMARY

Aspects of the disclosure provide a method for binding a user with a device. The method includes receiving a binding request sent by a terminal device. The binding request carries a registered user identification (ID) for the user to log into a client program on the terminal device. Further, the method includes determining whether the binding request is sent from a present local area network in which the device is connected. When the binding request is sent from the present local area network, the method includes sending the binding request to a server for the server to establish a binding relationship between the registered user ID and the device. After the binding relationship is established, the method includes receiving a notification message sent by the server for informing that the binding relationship has been established, and forwarding the notification message to the terminal device.

Aspects of the disclosure provide a method used in a terminal device for binding a user with a service device. The method includes sending a binding request to the service device in a present local area network in which the service device is connected. The binding request carries a registered user ID for the user to log into a client program on the terminal device. The service device can forward the binding request to a server device after the service device confirms that the binding request is originated from the present local area network. The server device can verify the registered user ID, and establish a binding relationship between the registered user ID and the service device when the service device is available for binding. After the establishment of the binding relationship, the server device can transmit a notification message to the service device. The service device can forward the notification message to the terminal device. Then, the method includes receiving, at the terminal device, the notification message forwarded by the service device for informing that the binding relationship between the registered user ID and the service device has been properly established.

Aspects of the disclosure provide an apparatus for binding a user with the apparatus. The apparatus includes a memory storing instructions, and a processor to execute the instructions. The processor is configured to perform receiving a binding request sent by a terminal device. The binding request carries a registered user ID for a user to log into a client program on the terminal device. Further, the processor is configured to perform determining whether the binding request is sent from a present local area network in which the device is connected. Inert the binding request is sent from the present local area network, the processor is configured to perform sending the binding request to a server for the server to establish a binding relationship between the registered user ID and the device. After the binding relationship is established, the processor is configured to perform receiving a notification message sent by the server for informing that the binding relationship has been established, and forwarding the notification message to the terminal device.

Aspects of the disclosure provide a terminal device for binding a user with a service device. The terminal device includes a processor and a memory for storing instructions executable by the processor. The processor is configured to perform sending a binding request to the service device in a present local area network in which the service device and the terminal device are connected. The binding request carries a registered user ID for the user to log into a client program on the terminal device. Further, the process is configure to perform receiving a notification message forwarded by the service device. The notification message informs that a binding relationship between the registered user ID and the service device has been properly established. The notification message is sent by a server device after the server device receives the binding request from the service device, and properly establishes the binding relationship.

Aspects of the disclosure provide a non-transitory computer-readable storage medium storing instructions for causing a processor in a device to execute operations for binding a user with the device. The operations include receiving a binding request sent by a terminal device. The binding request carries a registered user ID for a user to log into a client program on the terminal device. Further, the operations include determining whether the binding request is sent from a present local area network in which the device is connected. When the binding request is sent from the present local area network, the operations includes sending the binding request to a server for the server to establish a binding relationship between the registered user ID and the device. After the binding relationship is established, the operations include receiving a notification message sent by the server for informing that the binding relationship has been established, and forwarding the notification message to the terminal device.

Aspects of the disclosure provide a non-transitory computer-readable storage medium storing instructions for causing a processor in a terminal device to execute operations for binding a user with a service device. The operations include sending a binding request to the service device in a present local area network. The service device and the terminal device are both in the present local area network and can communicate via the present local area network. The binding request carries a registered user ID for the user to log into a client program on the terminal device. Further, the operations include receiving a notification message forwarded by the service device, for informing that a binding relationship between the registered user ID and the service device has been properly established. The notification message is sent by a server after the service device sends the binding request to the server and the server has properly established the binding relationship.

Aspects of the disclosure provide a method used in a server device for binding a user with a service device. The method includes receiving, at the server device, a binding request sent by the service device. The binding request is originated on a terminal device. The binding request carries a registered user identification (ID) that is used by the user to log into a client program on the terminal device. The terminal device and the service device are connected in a present local area network, and the terminal device sends the binding request to the service device via the present local area network. The service device can forward the binding request to the server device after the service device confirms that the binding request is originated from the present local area network. Then, the method includes verifying the registered user ID, establishing a binding relationship between the registered user ID with the service device when the service device is available for binding, and sending a notification message to the service device to inform the establishment of the binding relationship. Then the notification message can be forward by the service device to the terminal device. Further, aspects of the disclosure can provide the server device for binding the user with the service device. The server device can include a processor and a memory storing instructions to be executed by the processor. The processor can execute the instructions to let the server device to use the method to bind the user with the service device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations out forth in the following description of exemplary embodiments do not represent all implementations consistent with the invention. Instead, they are merely examples of apparatuses and methods consistent with aspects related to the invention as recited in the appended claims.

The terms used herein are merely for describing a particular embodiment, rather than limiting the present disclosure. As used in the present disclosure and the appended claims, terms in singular form such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the text, a term "if" as used herein can be interpreted as "when", "where" or "in response to".

Currently, if a user wants to obtain permission to access and control a smart device, the user can install a client program of the smart device on a terminal, perform register, and establish a binding relationship between the registered user account (e.g. a registered use ID) and the smart device via a corresponding server. After the binding relationship is established, the user can have a master permission to the smart device, and subsequently once he logins in the client program of the smart device with the registered user account, the user can interact with the smart device and to access, control or otherwise operate the smart device through the client program. For example, the smart device can be a smart home device, and after a binding relationship between the registered user account and the smart home device is established, the user can control the smart home device to be switched on or off through the client program of the smart device.

In practical application, since it is desirable for the user to remotely control the smart device, generally, a smart device in a local area network can be connected to the Internet. Since the smart device generally has a characteristic of opened interaction and operation, if the registered user account leaks out during the binding process between the registered user account and the smart device, other user can complete a binding with the smart device using this registered user account, (this is because the server will verify the legitimacy of the to-be-bound user only based on the registered user account during the establishment of the binding relationship), thereby causing incorrect binding and posing a critical security risk for the smart device.

In view of the above, the present disclosure provides a method for binding with a device, in which a binding request sent by a local terminal is received by a to-be-bound device, the binding request carrying a registered user ID; it is judged whether the binding request is sent from a present local area network; when the binding request is sent from the present local area network, the binding request is sent to a server for the server to establish a binding relationship between the registered user ID and the device. Since the to-be-bound device only receives a binding request sent by a local terminal and a binding relationship can be established only when the binding request is sent from the present local area network, the smart device cannot be bound with a terminal outside the present local area network. Thereby, it can avoid an incorrect binding due to leakage of a registered user account and can thus improve the security of the device.

Figure 1:
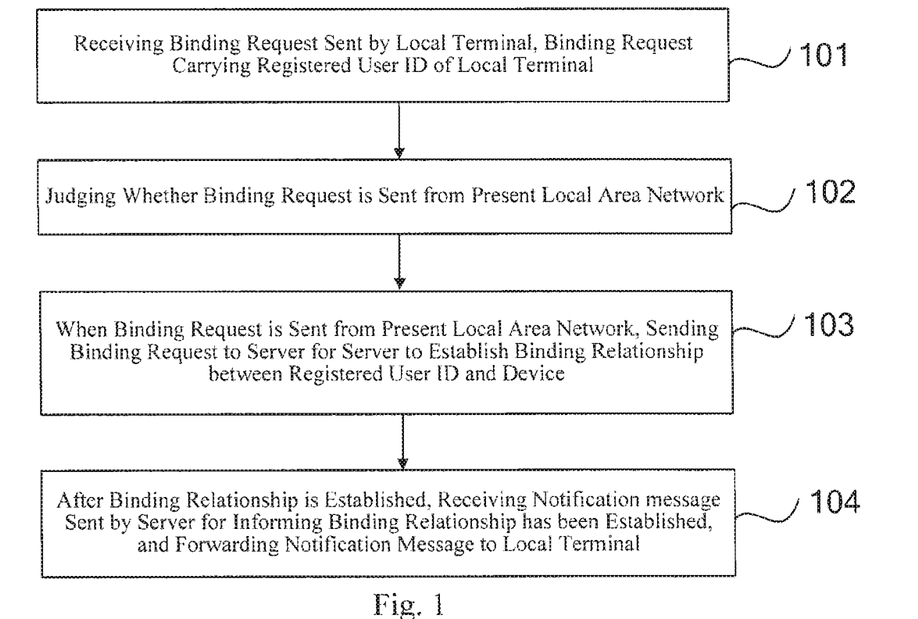
FIG. 1 is a flow chart showing a method for binding with a device according to an exemplary embodiment.

FIG. 1 is a flow chart showing a method for binding a user with a device (smart device, service device) according to an exemplary embodiment. In an example, the device, is a smart device, and the method is applied in the smart device. The method includes the following steps.

In step 101, a binding request sent by a local terminal (terminal device) is received at the smart device, the binding request carrying a registered user ID for the user to log in a client program on the local terminal;

in step 102, the smart device judged whether the binding request is sent from a present local area network;

in step 103, when the binding request is sent from the present local area network, the binding request is sent to a server (server device) for the server to establish a binding relationship between the registered user ID and the smart device; and in step 104, after the binding relationship is established, the smart device receives a notification message sent by the server for informing the binding relationship has been established, and the notification message is forwarded to the local terminal.

In the present embodiment, the local area network can be a wireless network based on WI-FI, and the smart device can have a built-in WI-FI module.

Initially, the smart device can be connected to the wireless local area network through the built-in WWI module, and on the other hand, the user can connect the terminal into the wireless local area network. After both of the smart device and the terminal are properly connected to the wireless local area network, the smart device and the terminal are in the same local area network, Subsequently, the user can, through a client program of the smart device installed on the terminal, initiate a binding with the smart device to obtain permission to access and control the smart device. For example, in an implementation, a function switch "initiate binding" can be provided in the client program for the user to initiate the binding with the smart device by switching on the function switch.

Wherein, to be bound with the smart device through the client program, the user can generally send to a server a binding request carrying a registered account of the user and an ID of the smart device. The server verifies the identification of the registered account. If the smart device has not been bound with other users, a binding relationship between the registered account and the smart device can be directly established in local. Since during the establishing process of the binding relationship, the sever verifies the identity based on the registered user account, once the registered account leaks out, the registered account can be used by other illegal users to bind with the smart device, thus posing a security risk.

In the present embodiment, since a device (i.e. a local terminal) in the same local area network with the smart device is generally a trustable device, to improve the security in the establishing process of the binding relationship between the user and the smart device and avoid incorrect binding, during the binding process, the smart device can only accept a binding initiated by a device in the wireless local area network and discard or reject the binding initiated by a device in the non-local area network. Thereby, the probability of incorrect binding can be reduced to minimum.

In an implementation, the smart device can start a transmission service in local oriented to the present wireless local area network. After the transmission service is started, the client program can send a binding request to the smart device based on the transmission service. The smart device can receive the binding request sent from a device in the present wireless local area network based on the transmission service, and the smart device in turn sends the received binding request to the server to complete the establishment of the binding relationship.

In the present embodiment, since the binding request is not directly sent to the server by the user through the program, but sent by the to-be-bound smart device, it can ensure that the server receives a binding request from a device in the present local area network in which the smart device is connected, and limit the party intending to bind with the smart device to a trustable device in the present local area network in which the smart device is connected.

Wherein, the transmission service oriented to the present wireless local area network can be a UDP service, and in the following, the technical solution of the present disclosure is described in connection with an example in which the transmission service is a UDP service.

Initially, after the smart device is properly connected to the present wireless local area network, in default, a UDP port oriented to the present wireless local area network can be opened in background. The port number of the UDP port is not particularly limited in the present embodiment. For example, it can be a non-famous port number or a private port number. Moreover, the client program of the smart device can also configure the port number of the UDP port in advance. When the user initiates binding with the smart device through the client program, the client program can send a binding request to the UDP port based on the previously configured UDP port number. Then the binding request can carry a registered account of the user. If there are more than one smart device in the present wireless local area network, the binding request can also carry an ID of the smart device (for example, a hardware address of the smart device) to distinguish among them. However, if the client program does not configure the UDP port number in advance, after the UDP port is started, the smart device can also send a broadcast message in the present wireless local area network, to inform the port number of the UDP port to all of client programs in the present wireless local area network which receive the broadcast message.

In the present embodiment, to receive a binding request sent by a client program in the present wireless local area network, the smart device can monitor the UDP port in real time after the UDP port is started. Once the UDP port receives a binding request sent by a client program in the present wireless local area network, the smart device can immediately acquire the binding request from the UDP port and then judge whether the received binding request is sent from the present local area network. If the binding request is sent from the present local area network, the smart device can send the binding request to the server for the server to establish a binding relationship between the registered user ID and the smart device.

Wherein, to judge whether the received binding request is sent from the present local area network, the smart device can judge whether an IP address in the binding request matches with an IP network segment of the present local area network. For example, the smart device can acquire an IP address of the gateway and a subnet mask of the present wireless local area network, determine the IP network segment of the present local area network based on the IP address of the gateway and the subnet mask, and then match the IP address in the binding request with the IP network segment of the present local area network. If it matches with the IP network segment, it can be determined that the binding request is sent from the present local area network; otherwise, if it does not match with the IP network segment, it means that the binding request might come from a network other than the present local area network. The smart device will directly discard or reject a binding request come from a network other than the present local area network for the sake of security.

In the present embodiment, after the server receives the binding request forwarded by the smart device, the server can firstly verify the registered account in the binding request. If the registered account passes the verification, the server can also examine whether the ID of the smart device in the binding request has been bound with another user in local. If the ID has not been bounded with another user in local, the server can directly establish in local a binding relationship between the registered account and the ID of the smart device in the binding request. After the binding relationship is properly established, the server can also send a notification message to the smart device for informing that the binding has been properly established. Then, the smart device forwards the notification message to the corresponding terminal in the present local area network. Subsequently, the user can access and control the smart device remotely by logging in the client program of the smart device with the registered account that is properly bound with the smart device.

It should be noted that, in an implementation, the transmission service oriented to the present wireless local area network can be a service other than the UDP service. For example, the transmission service can also be a HTTP service. When the transmission service is a HTTP service, the smart device can start a private IP address oriented to the present wireless local area network. Then, based on HTTP, the client program on the terminal can communicate with the smart device via the private IP address and send a binding request to the smart device, Which will not be elaborated in the present embodiment.

In the above embodiment, a binding request sent by a local terminal is received by a to-be-bound device, the binding request carrying a registered user ID; it is judged whether the binding request is sent from a present local area network; when the binding request is sent from the present local area network, the binding request is sent to a server for the server to establish a binding relationship between the registered user ID and the device. Since the to-be-bound device only receives a binding request sent by a local terminal and a binding relationship can be established only when the binding request is sent from the present local area network, the smart device cannot be bound with a terminal outside the present local area network. Thereby, it can avoid an incorrect binding due to leakage of a registered user account and can thus improve the security of the device.

Figure 2:
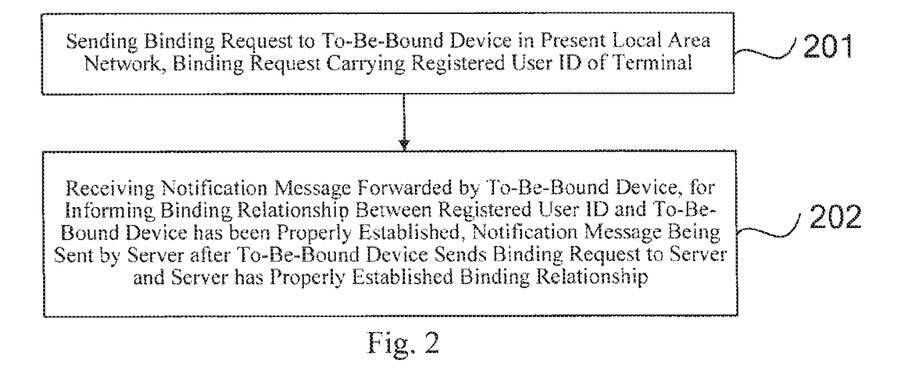
FIG. 2 is a flow chart showing another method for binding with a device according to an exemplary embodiment.

FIG. 2 is a flow chart showing a method for binding with a device according to an exemplary embodiment, which is applied in a terminal. The method includes the following steps.

In step 201, a binding request is sent to a to-be-bound device in a present local area network, the binding request carrying a registered user ID of the terminal; and in step 202, it is received a notification message forwarded by the to-be-bound device, for informing a binding relationship between the registered user ID and the to-be-bound device has been properly established, the notification message being sent by a server after the to-be-bound device sends the binding request to the server and the server has properly established the binding relationship.

In the present embodiment, the present local area network can be a wireless network based on and the to-be-bound device can have a built-in WI-FI module.

Initially, the smart device can be connected to the wireless local area network through the built-in WIFI module, and on the other hand, the user can connect the terminal into the wireless local area network. After both of the smart device and the terminal are properly connected to the wireless local area network, the smart device and the terminal are in the same local area network. Subsequently, the user can, through a client program of the smart device installed on the terminal, initiate a binding with the smart device to obtain permission to access and control the smart device. For example, in an implementation, a function switch "initiate binding" can be provided in the client program for the user to initiate the binding with the smart device by switching on the function switch.

Wherein, to be bound with the smart device through the client program, the user can generally send to a server a binding request carrying a registered account of the user and an ID of the smart device. The server verifies the identification of the registered account. If the smart device has not been bound with other users, a binding relationship between the registered account and the smart device can be directly established in local. Since during the establishing process of the binding relationship, the sever verifies the identity based on the registered user account, once the registered account leaks out, the registered account can be used by other illegal users to bind with the smart device, thus posing a security risk.

In the present embodiment, since a device (i.e. a local terminal) in the same local area network with the smart device is generally a trustable device, to improve the security in the establishing process of the binding relationship between the user and the smart device and avoid incorrect binding, during the binding process, the smart device can only accept a binding initiated by a device in the wireless local area network and discard or reject the binding initiated by a device in the non-local area network. Thereby, the probability of incorrect binding can be reduced to minimum.

In an implementation, the smart device can start a transmission service in local oriented to the present wireless local area network. After the transmission service is started, the client program can send a binding request to the smart device based on the transmission service. The smart device can receive the binding request sent from a device in the present wireless local area network based on the transmission service, and the smart device in turn sends the received binding request to the server to complete the establishment of the binding relationship.

In the present embodiment, since the binding request is not directly sent to the server by the user through the program, but sent by the to-be-bound smart device, it can ensure that the server receives a binding request from a device in the present local area network in which the smart device is connected, and limit the party intending to bind with the smart device to a trustable device in the present local area network in which the smart device is connected.

Wherein, the transmission service oriented to the present wireless local area network can be a UDP service, and in the following, the technical solution of the present disclosure is described in connection with an example in which the transmission service is a UDP service.

Initially, after the smart device is properly connected to the present wireless local area network, in default, a UDP port oriented to the present wireless local area network can be opened in background. The port number of the UDP port is not particularly limited in the present embodiment. For example, it can be anon-famous port number or a private port number. Moreover, the client program of the smart device can also configure the port number of the UDP port in advance. When the user initiates binding with the smart device through the client program, the client program can send a binding request to the UDP port based on the previously configured UDP port number. Then the binding request can carry a registered account of the user. If there are more than a smart device in the present wireless local area network, the binding request can also carry an ID of the smart device (for example, a hardware address of the smart device) to distinguish among them.

However, if the client program does not configure the UDP port number in advance, after the UDP port is started, the smart device can also send a broadcast message in the present wireless local area network, to inform the port number of the UDP port to all of client programs in the present wireless local area network which receive the broadcast message.

In the present embodiment, to receive a binding request sent by a client program in the present wireless local area network, the smart device can monitor the UDP port in real time after the UDP port is started. Once the UDP port receives a binding request sent by a client program in the present wireless local area network, the smart device can immediately acquire the binding request from the UDP port and then judge whether the received binding request is sent from the present local area network. If the binding request is sent from the present local area network, the smart device can send the binding request to the server for the server to establish a binding relationship between the registered user ID and the smart device.

Wherein, to judge whether the received binding request is sent from the present local area network, the smart device can judge whether an IP address in the binding request matches with an IP network segment of the present local area network. For example, the smart device can acquire an IP address of the gateway and a subnet mask of the present wireless local area network, determine the IP network segment of the present local area network based on the IP address of the gateway and the subnet mask, and then match the IP address in the binding request with the IP network segment of the present local area network. If it matches with the IP network segment, it can be determined that the binding request is sent from the present local area network; otherwise, if it does not match with the IP network segment, it means that the binding request might conic from a network other than the present local area network. The smart device will directly discard or reject a binding request come from a network other than the present local area network for the sake of security.

In the present embodiment, after the server receives the binding request forwarded by the smart device, the server can firstly verify the registered account in the binding request. If the registered account passes the verification, the server can also examine Whether the ID of the smart device in the binding request has been bound with another user in local. If the ID has not been bounded with another user in local, the server can directly establish in local a binding relationship between the registered account and the ID of the smart device in the binding request. After the binding relationship is properly established, the server can also send a notification message to the smart device for informing that the binding has been properly established. Then, the smart device forwards the notification message to the corresponding terminal in the present local area network. Subsequently, the user can access and control the smart device remotely by logging in the client program of the smart device with the registered account that is properly bound with the smart device.

It should be noted that, in an implementation, the transmission service oriented to the present wireless local area network can be a service other than the UDP service. For example, the transmission service can also be a HTTP service. When the transmission service is a HTTP service, the smart device can start a private IP address oriented to the present wireless local area network. Then, based on HTTP, the client program on the terminal can communicate with the smart device via the private IP address and send a binding request to the smart device, which will not be elaborated in the present embodiment.

In the above embodiment, a binding request sent by a local terminal is received by a to-be-bound device, the binding request carrying a registered user ID; it is judged whether the binding request is sent from a present local area network; when the binding request is sent from the present local area network, the binding request is sent to a server for the server to establish a binding relationship between the registered user ID and the device. Since the to-be-bound device only receives a binding request sent by a local terminal and a binding relationship can be established only when the binding request is sent from the present local area network, the smart device cannot be found with a terminal outside the present local area network. Thereby, it can avoid an incorrect binding due to leakage of a registered user account and can thus improve the security of the device.

Figure 3:
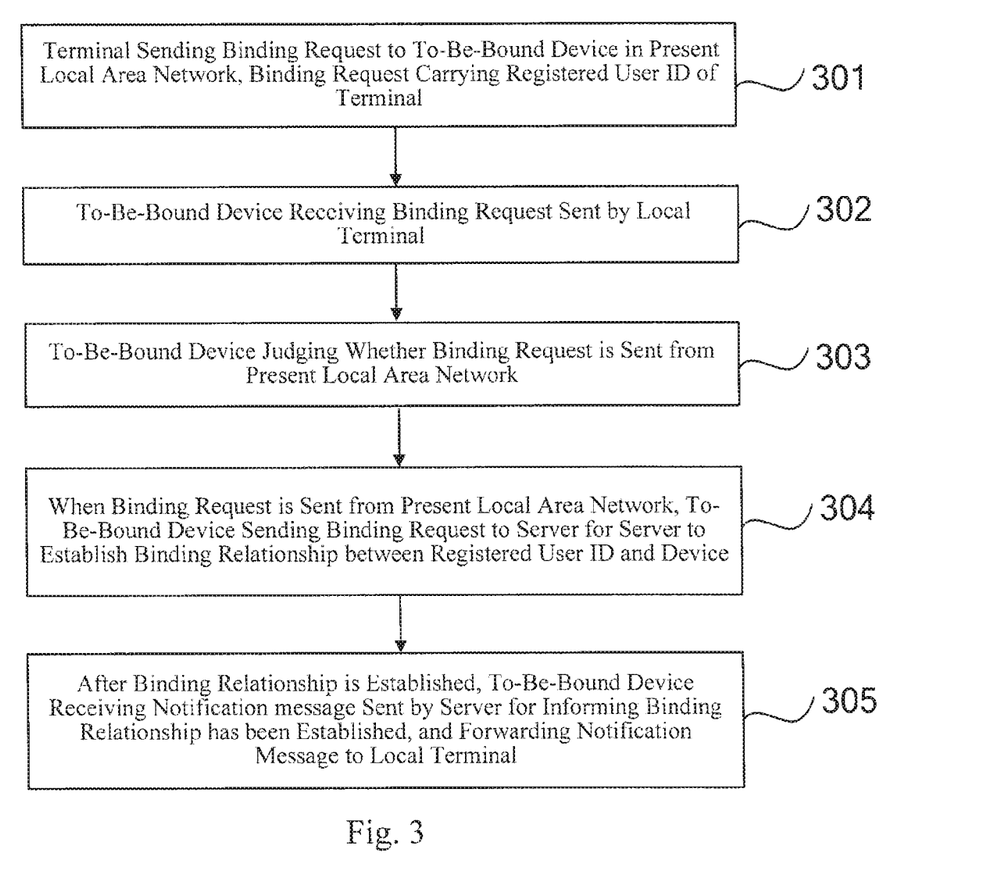
FIG. 3 is a flow chart showing another method for binding with a device according to an exemplary embodiment.

FIG. 3 is a flow chart showing a method for binding with a device according to an exemplary embodiment. The method includes the following steps.

In step 301, a terminal sends a binding request to a to-be-bound device in a present local area network, the binding request carrying a registered user ID of the terminal;

in step 302, the to-be-bound device receives the binding request sent by the local terminal;

in step 303, the to-be-bound device judges whether the binding request is sent from a present local area network;

in step 304, when the binding request is sent from the present local area network, the to-be-bound device sends the binding request to a server for the server to establish a binding relationship between the registered user ID and the device; and in step 305, after the binding relationship is established, the to-be-bound device receives a notification message sent by the server for informing the binding relationship has been established, and forwards the notification message to the local terminal.

In the present embodiment, the local area network can be a wireless network based on WI-FI, and the to-be-bound device can have a built-in WI-FI module.

Initially, the smart device can be connected to the wireless local area network through the built-in WIFI module, and on the other hand, the user can connect the terminal into the wireless local area network. After both of the smart device and the terminal are properly connected to the wireless local area network, the smart device and the terminal are in the same local area network. Subsequently, the user can, through a client program of the smart device installed on the terminal, initiate a binding with the smart device to obtain permission to access and control the smart device. For example, in an implementation, a function switch "initiate binding" can be provided in the client program for the user to initiate the binding with the smart device by switching on the function switch.

Wherein, to be bound with the smart device through the client program, the user can generally send to a server a binding request carrying a registered account of the user and an ID of the smart device. The server verifies the identification of the registered account. If the smart device has not been bound with other users, a binding relationship between the registered account and the smart device can be directly established in local. Since during the establishing process of the binding relationship, the sever verifies the identity based on the registered user account, once the registered account leaks out, the registered account can be used by other illegal users to bind with the smart device, thus posing a security risk.

In the present embodiment, since a device (i.e. a local terminal) in the same local area network with the smart device is generally a trustable device, to improve the security in the establishing process of the binding relationship between the user and the smart device and avoid incorrect binding, during the binding process, the smart device can only accept a binding initiated by a device in the wireless local area network and discard or reject the binding initiated by a device in the non-local area network. Thereby, the probability of incorrect binding can be reduced to minimum.

In an implementation, the smart device can start a transmission service in local oriented to the present wireless local area network. After the transmission service is started, the client program can send a binding request to the smart device based on the transmission service. The smart device can receive the binding request sent from a device in the present wireless local area network based on the transmission service, and the smart device in turn sends the received binding request to the server to complete the establishment of the binding relationship.

In the present embodiment, since the binding request is not directly sent to the server by the user through the client program, but sent by the to-be-bound smart device, it can ensure that the server receives a binding request from a device in the present local area network in which the smart device is connected, and limit the party intending to bind with the smart device to a trustable device in the present local area network in which the smart device is connected.

Wherein, the transmission service oriented to the present wireless local area network can be a UDP service, and in the following, the technical solution of the present disclosure is described in connection with an example in which the transmission service is a UDP service.

Initially, after the smart device is properly connected to the present wireless local area network, in default, a UDP port oriented to the present wireless local area network can be opened in background. The port number of the UDP port is not particularly limited in the present embodiment. For example, it can be a non-famous port number or a private port number. Moreover, the client program of the smart device can also configure the port number of the UDP port in advance. When the user initiates binding with the smart device through the client program, the client program can send a binding request to the UDP port based on the previously configured UDP port number. Then the binding request can carry a registered account of the user. If there are more than one smart device in the present wireless local area network, the binding request can also carry an ID of the smart device (for example, a hardware address of the smart device) to distinguish among them.

However, if the client program does not configure the UDP port number in advance, after the UDP port is started, the smart device can also send a broadcast message in the present wireless local area network, to inform the port number of the UDP port to all of client programs in the present wireless local area network Which receive the broadcast message.

In the present embodiment, to receive a binding request sent by a client program in the present wireless local area network, the smart device can monitor the UDP port in real time after the UDP port is started. Once the UDP port receives a binding request sent by a client program in the present wireless local area network, the smart device can immediately acquire the binding request from the UDP port and then judge whether the received binding request is sent from the present local area network. If the binding request is sent from the present local area network, the smart device can send the binding request to the server for the server to establish a binding relationship between the registered user ID and the smart device.

Wherein, to judge whether the received binding request is sent from the present local area network, the smart device can judge whether an IP address in the binding request matches with an IP network segment of the present local area network. For example, the smart device can acquire an IP address of the gateway and a subnet mask of the present wireless local area network, determine the IP network segment of the present local area network based on the IP address of the gateway and the subnet mask, and then match the IP address in the binding request with the IP network segment of the present local area network. If it matches with the IP network segment, it can be determined that the binding request is sent from the present local area network; otherwise, if it does not match with the IP network segment, it means that the binding request might come from a network other than the present local area network. The smart device will directly discard or reject a binding request come from a network other than the present local area network for the sake of security.

In the present embodiment, after the server receives the binding request forwarded by the smart device, the server can firstly verify the registered account in the binding request. If the registered account passes the verification, the server can also examine whether the ID of the smart device in the binding request has been bound with another user in local. If the ID has not been bounded with another user in local, the server can directly establish in local a binding relationship between the registered account and the ID of the smart device in the binding request. After the binding relationship is properly established, the server can also send a notification message to the smart device for informing that the binding has been properly established. Then, the smart device forwards the notification message to the corresponding terminal in the present local area network. Subsequently, the user can access and control the smart device remotely by logging in the client program of the smart device with the registered account that is properly bound with the smart device.

It should be noted that, in an implementation, the transmission service oriented to the present wireless local area network can be a service other than the UDP service. For example, the transmission service can also be a HTTP service. When the transmission service is a HTTP service, the smart device can start a private IP address oriented to the present wireless local area network. Then, based on HTTP, the client program on the terminal can communicate with the smart device via the private IP address and send a binding request to the smart device.

However, since after the smart device and the registered account of the user are properly bound, the user generally wants to access and control the smart device remotely, when the user accesses and controls the smart device remotely outside the coverage of the present wireless local area network, the IP address of the access message of the user has to be subject to network address translation (NAT) by the router of the local wireless network and the access message can reach the smart device. Accordingly, there is a problem of NAT crossing in the remote access and control to the smart device.

Currently, a most commonly used and most effective way for NAT crossing is to configure a UDP port for NAT crossing. If the user starts a UDP port number through the smart device for the transmission service with respect to the smart device, the access message can directly cross a NAT firewall in the local wireless router to complete the IP address translation, and reach the smart device. Wherein configuring a UDP port number for NAT crossing is well-known technology to those skilled in the art, which will not be elaborated in the present embodiment.

If the user starts a HTTP service through the smart device for the transmission service with respect to the smart device, the access message cannot directly cross the NAT firewall in the local wireless router to complete the IP address translation. In this case, the smart device can perform polling to periodically request an access message from the server. This will cause a delay in the remote access of the smart device. Accordingly, it is advantageous for the smart device to use a UDP service as a transmission service oriented to the present wireless local area network.

In the above embodiment, a binding request sent by a local terminal is received by a to-be-bound device, the binding request carrying a registered user ID; it is judged whether the binding request is sent from a present local area network; when the binding request is sent from the present local area network, the binding request is sent to a server for the server to establish a binding relationship between the registered user ID and the device. Since the to-be-bound device only receives a binding request sent by a local terminal and a binding relationship can be established only when the binding request is sent from the present local area network, the smart device cannot be bound with a terminal outside the present local area network. Thereby, it can avoid an incorrect binding due to leakage of a registered user account and can thus improve the security of the device.

Corresponding to the above embodiments of methods for binding with a device, the present disclosure also provides embodiments of apparatuses.

Figure 4:
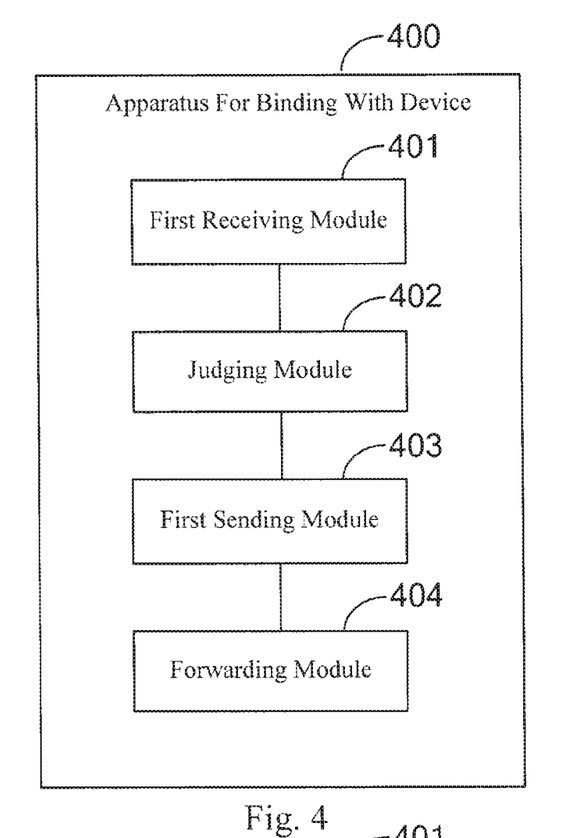
FIG. 4 is a block diagram illustrating an apparatus for binding with a device according to an exemplary embodiment.

FIG. 4 is a block diagram illustrating an apparatus for binding with a device according to an exemplary embodiment.

As shown in FIG. 4 is an apparatus 400 for binding with a device according to an exemplary embodiment, including: a first receiving module 401, a judging module 402, a first sending module 403 and a forwarding module 404; wherein the first receiving module 401 is configured to receive a binding request sent by a local terminal, the binding request carrying a registered user ID of the local terminal;

the judging module 402 is configured to judge whether the binding request is sent from a present local area network;

the first sending module 403 is configured to, when the binding request is sent from the present local area network, send the binding request to a server for the server to establish a binding relationship between the registered user ID and the device; and the forwarding module 404 is configured to, after the binding relationship is established, receive a notification message sent by the server for informing the binding relationship has been established, and forward the notification message to the local terminal.

In the above embodiment, a binding request sent by a local terminal is received by a to-be-bound device, the binding request carrying a registered user ID; it is judged whether the binding request is sent from a present local area network; when the binding request is sent from the present local area network, the binding request is sent to a server for the server to establish a binding relationship between the registered user ID and the device. Since the to-be-bound device only receives a binding request sent by a local terminal and a binding relationship can be established only when the binding request is sent from the present local area network, the smart device cannot be bound with a terminal outside the present local area network. Thereby, it can avoid an incorrect binding due to leakage of a registered user account and can thus improve the security of the device.

Figure 5:
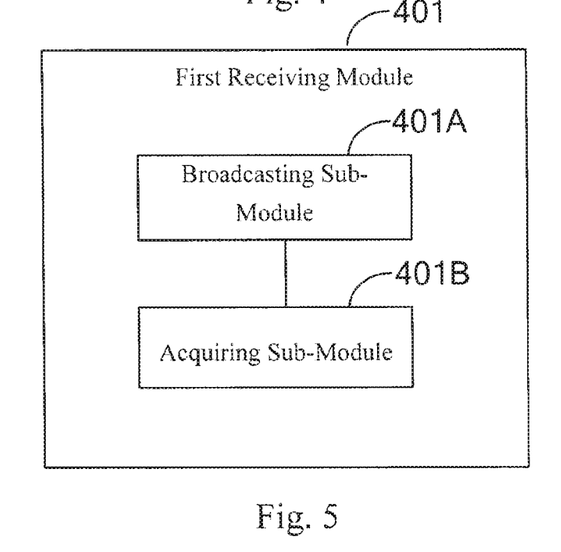
FIG. 5 is a block diagram illustrating another apparatus for binding with a device according to an exemplary embodiment.

FIG. 5 is a block diagram illustrating another apparatus for binding with a device according to an exemplary embodiment, based on the embodiment as shown in the above FIG. 4. When a transmission service of the present local area network includes a User Datagram Protocol UDP service, the first receiving module 401 can include: a broadcasting sub-module 401A and an acquiring sub-module 401B; wherein the broadcasting sub-module 401A is configured to broadcast a port number of a UDP port opened by the UDP service through the present local area network; and the acquiring sub-module 401B is configured to monitor the UDP port, and acquire a binding request sent by a local terminal in the present local area network to the device based on the port number of the UDP port.

Figure 6:
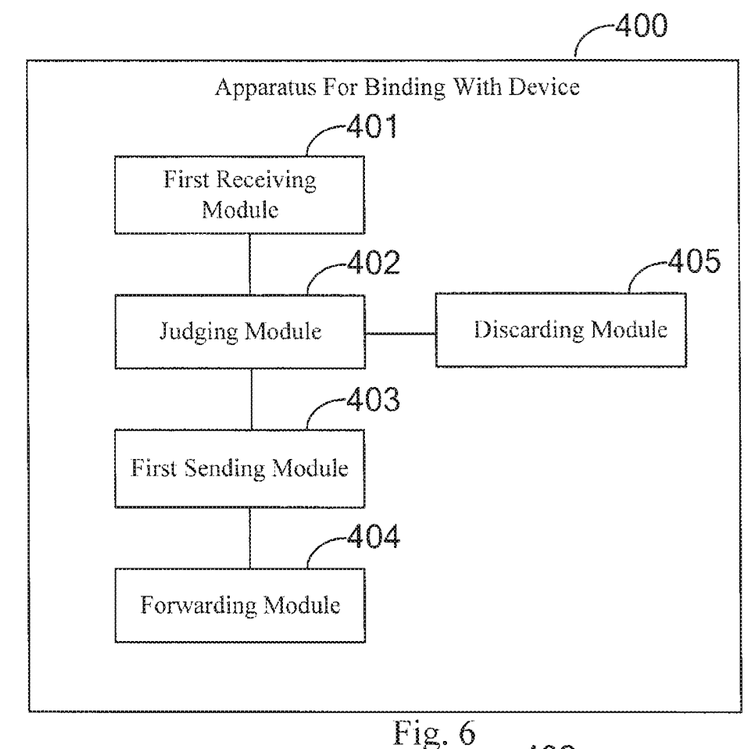
FIG. 6 is a block diagram illustrating another apparatus for binding with a device according to an exemplary embodiment.

FIG. 6 is a block diagram illustrating another apparatus for binding with a device according to an exemplary embodiment, based on the embodiment as shown in the above 4. The apparatus 400 can also include: a discarding module 405; wherein the discarding module 405 is configured to, when the binding request is sent from a network other than the present local area network, discard or reject the binding request.

It should be noted that, the discarding module 405 above as shown in FIG. 6 can also be included in the apparatus according to the above embodiment as shown in FIG. 5. This is not limited in the present disclosure.

Figure 7:
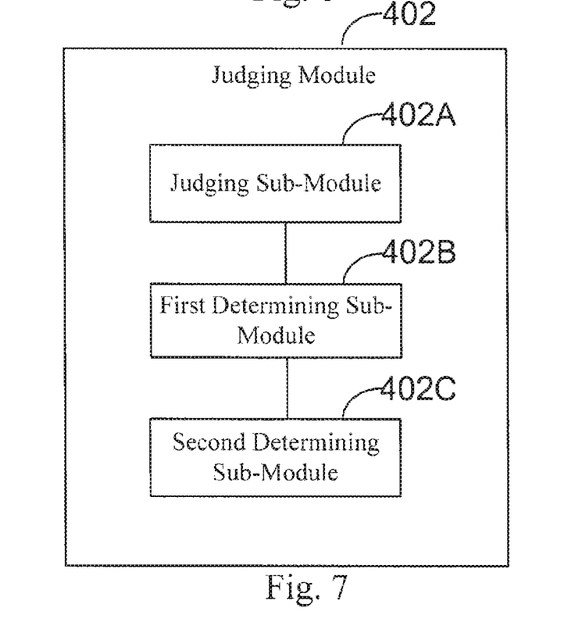
FIG. 7 is a block diagram illustrating another apparatus for binding with a device according to an exemplary embodiment.

FIG. 7 is a block diagram illustrating another apparatus for binding with a device according to an exemplary embodiment, based on the embodiment as shown in the above FIG. 4. The judging module 402 can include: a judging sub-module 402A, a first determining sub-module 402B and a second determining sub-module 402C; wherein the judging sub-module 402A is configured to judge whether an IP address of the binding request matches with an IP network segment of the present local area network;

the first determining sub-module 402B is configured to, when the IP address of the binding request matches with the IP network segment of the present local area network, determine that the binding request is sent from the present local area network; and the second determining sub-module 402C is configured to, when the IP address of the binding request does not match with the IP network segment of the present local area network, determine that the binding request is sent from a network other than the present local area network.

It should be noted that, the judging sub-module 40 the first determining sub-module 402B and the second determining sub-module 402C above as shown in FIG. 7 can also be included in the apparatus according to the above embodiments as shown in FIGS. 5-6. This is not limited in the present disclosure.

Figure 8:
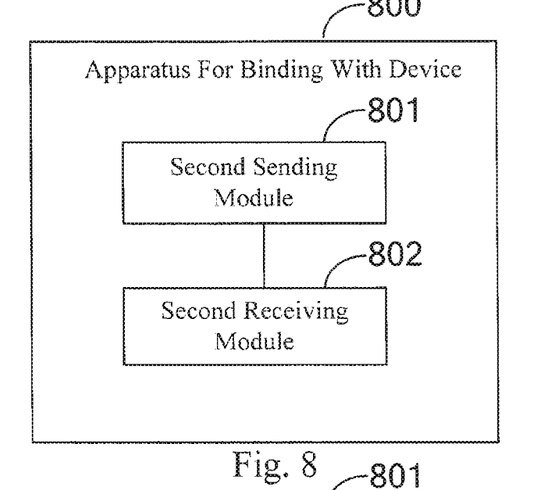
FIG. 8 is a block diagram illustrating another apparatus for binding with a device according to an exemplary embodiment.

FIG. 8 is a block diagram illustrating an apparatus for binding with a device according to an exemplary embodiment.

As shown in FIG. 8 is an apparatus 800 for binding with a device according to an exemplary embodiment, including: a second sending module 801 and a second receiving module 802; wherein the second sending module 801 is configured to send a binding request to a to-be-bound device in a present local area network, the binding request carrying a registered user ID of the apparatus; and the second receiving module 802 is configured to receive a notification message forwarded by the to-be-bound device, for informing a binding relationship between the registered user ID and the to-be-bound device has been properly established, the notification message being sent by a server after the to-be-bound device sends the binding request to the server and the server has properly established the binding relationship.

In the above embodiment, a binding request sent by a local terminal is received by a to-be-bound device, the binding request carrying a registered user ID; it is judged whether the binding request is sent from a present local area network; when the binding request is sent from the present local area network, the binding request is sent to a server for the server to establish a binding relationship between the registered user ID and the device. Since the to-be-bound device only receives a binding request sent by a local terminal and a binding relationship can be established only when the binding request is sent from the present local area network, the smart device cannot be hound with a terminal outside the present local area network. Thereby, it can avoid an incorrect binding due to leakage of a registered user account and can thus improve the security of the device.

Figure 9:
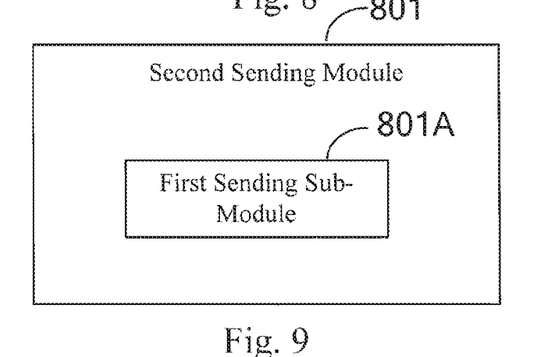
FIG. 9 is a block diagram illustrating another apparatus for binding with a device according to an exemplary embodiment.

FIG. 9 is a block diagram illustrating another apparatus for binding with a device according to an exemplary embodiment, based on the embodiment as shown in the above FIG. 8. When a transmission service of the present local area network includes a User Datagram Protocol UDP service, the second sending module 801 can include: a first sending sub-module 801A; wherein the first sending sub-module 801A is configured to send the binding request to the to-be-bound device based on a locally preset port number of a UDP port opened by the UDP service.

Figure 10:
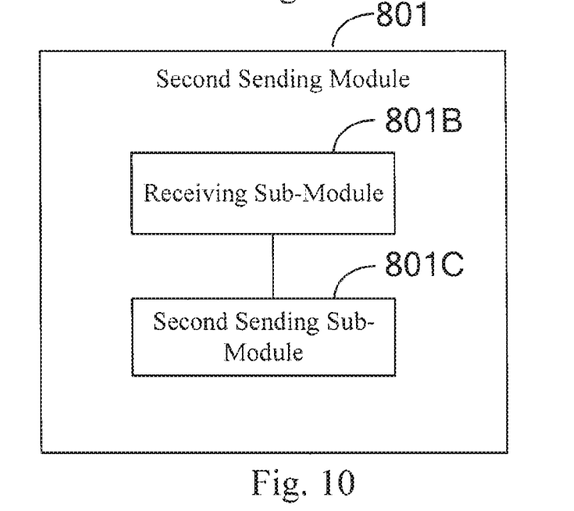
FIG. 10 is a block diagram illustrating another apparatus for binding with a device according to an exemplary embodiment.

FIG. 10 is a block diagram illustrating another apparatus for binding with a device according to an exemplary embodiment, based on the embodiment as shown in the above FIG. 8, When a transmission service of the present local area network includes a User Datagram Protocol UDP service, the second sending module 801 can include: a receiving sub-module 801B and a second sending sub-module 801C; wherein the receiving sub-module 801B is configured to receive a port number of a UDP port opened by the UDP service which is broadcast by the to-be-bound device in the present local area network; and the second sending sub-module 801C is configured to send the binding request to the to-be-bound device based on the received port number.

It should be noted that, the receiving sub-module 801B and the second sending sub-module 801C above as show in FIG. 10 can also be included in the apparatus according to the above embodiment as shown in FIG. 9. This is not limited in the present disclosure.

Specific implementation of the operations and functions of the modules or units in the above devices can be referred to the implementation of corresponding steps in the above methods, which will not be repeated herein.

For the embodiments regarding apparatuses, since they correspond to the embodiments regarding methods, they can be referred to the description of the embodiments regarding methods. The embodiments regarding apparatuses described above are merely illustrative. The units described as separate components may be or may not be physically separate, and the components illustrated as a units may be or may not be physical units, and may be at the same location, or may be distributed to multiple units over the network. Apart of or the whole of the modules can be selected to achieve the objective of the present disclosure as desired. One skilled in the art can understand and practice the embodiments without paying any creative labor.

Correspondingly, the present disclosure provides an apparatus for binding with a device, including:

a processor; and a memory for storing instructions executable by the processor;

wherein the processor is configured to perform:

receiving a binding request sent by a local terminal, the binding request carrying a registered user ID of the local terminal;

judging whether the binding request is sent from a present local area network:

when the binding request is sent from the present local area network, sending the binding request to a server for the server to establish a binding relationship between the registered user ID and the device; and after the binding relationship is established, receiving a notification message sent by the server for informing the binding relationship has been established, and forwarding the notification message to the local terminal.

Correspondingly, the present disclosure also provides a smart device, including a memory and one or more programs, wherein, the one or more programs are stored in the memory, and one or more processors are configured to execute the one or more programs that contain instructions to cause the one or more processors to perform:

receiving a binding request sent by a local terminal, the binding request carrying a registered user ID of the local terminal;

judging whether the binding request is sent from a present local area network;

when the binding request is sent from the present local area network, sending the binding request to a server for the server to establish a binding relationship between the registered user ID and the device; and after the binding relationship is established, receiving a notification message sent by the server for informing the binding relationship has been established, and forwarding the notification message to the local terminal.

Correspondingly, the present disclosure provides an apparatus for binding with a device, including:

a processor; and a memory for storing instructions executable by the processor;

wherein the processor is configured to perform:

sending a binding request to the to-be-bound device in a present local area network, the binding request carrying a registered user ID of the apparatus;

receiving a notification message forwarded by the to-be-bound device, for informing a binding relationship between the registered user ID and the to-be-bound device has been properly established, the notification message being sent by a server after the to-be-bound device sends the binding request to the server and the server has properly established the binding relationship.

Correspondingly, the present disclosure also provides a terminal, including a memory and one or more programs, wherein, the one or more programs are stored in the memory, and one or more processors are configured to execute the one or more programs that contain instructions to cause the one or more processors to perform:

sending a binding request to the to-be-bound device in a present local area network, the binding request carrying a registered user ID of the terminal;

receiving a notification message forwarded by the to-be-bound device, for informing a binding relationship between the registered user ID and the to-be-bound device has been properly established, the notification message being sent by a server after the to-be-bound device sends the binding request to the server and the server has properly established the binding relationship.

Figure 11:
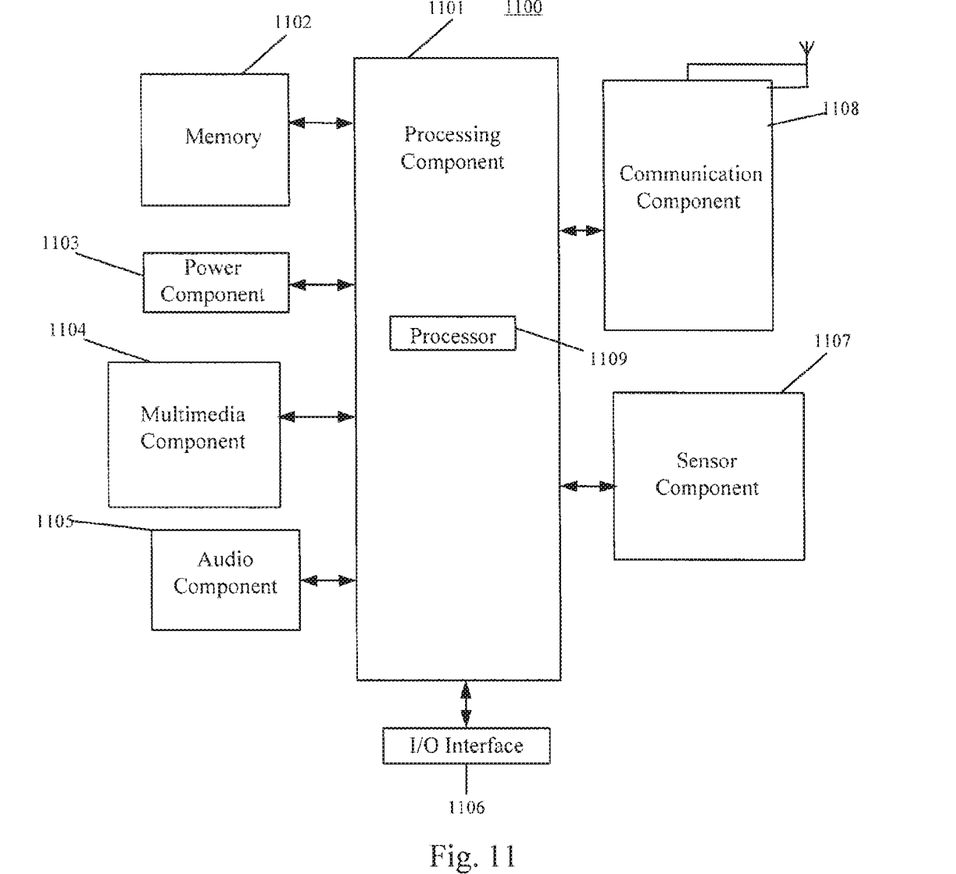
FIG. 11 is a block diagram illustrating another apparatus for binding with a device according to an exemplary embodiment.

FIG. 11 is a block diagram of an apparatus for binding with a device according to an exemplary embodiment.

As shown in FIG. 11 is an apparatus 1100 for binding with a device according to an exemplary embodiment. For example, the apparatus 1100 may be a mobile phone, a computer, a digital broadcast terminal, a messaging device, a gaming console, a tablet, a medical device, exercise equipment, a personal digital assistant, and the like.

Referring to FIG. 11, the apparatus 1100 may include one or more of the following components: a processing component 1101, a memory 1102, a power component 1103, a multimedia component 1104, an audio component 1105, an input/output (I/O) interface 1106, a sensor component 1107, and a communication component 1108.

The processing component 1101 typically controls overall operations of the apparatus 1100, such as the operations associated with display, telephone calls, data communications, camera operations, and recording operations. The processing component 1101 may include one or more processors 1109 to execute instructions to perform all or part of the steps in the above described methods. Moreover, the processing component 1101 may include one or more modules which facilitate the interaction between the processing component 1101 and other components. For instance, the processing component 1101 may include a multimedia module to facilitate the interaction between the multimedia component 1104 and the processing component 1101.

The memory 1102 is configured to store various types of data to support the operation of the apparatus 1100. Examples of such data include instructions for any applications or methods operated on the apparatus 1100, contact data, phonebook data, messages, pictures, video, etc. The memory 1102 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1103 provides power to various components of the apparatus 1100. The power component 1103 may include a power management system, one or more power sources, and any other components associated with the generation, management, and distribution of power in the apparatus 1100.

The multimedia component 1104 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1104 includes a front camera and/or a rear camera. The front camera and the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1105 is configured to output and/or input audio signals. For example, the audio component 1105 includes a microphone ("MIC") configured to receive an external audio signal when the apparatus 1100 is in an operation mode, such as a call mode, a recording mode, and a voice recognition mode. The received audio signal may be further stored in the memory 1102 or transmitted via the communication component 1108. In some embodiments, the audio component 1105 further includes a speaker to output audio signals.

The I/O interface 1106 provides an interface between the processing component 1101 and peripheral interface modules, such as a keyboard, a click wheel, buttons, and the like. The buttons may include, but are not limited to, a home button, a volume button, a starting button, and a locking button.

The sensor component 1107 includes one or more sensors to provide status assessments of various aspects of the apparatus 1100. For instance, the sensor component 1107 may detect an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1107 may include a proximity sensor configured to detect the presence of nearby objects without any physical contact. The sensor component 1107 may also include a light sensor, such as a CMOS or CCD image sensor, for use in imaging applications. In some embodiments, the sensor component 1107 may also include an accelerometer sensor, a gyroscope sensor, a magnetic sensor, a pressure sensor, or a temperature sensor.

The communication component 1108 is configured to facilitate communication, wired or wirelessly, between the apparatus 1100 and other devices. The apparatus 1100 can access a wireless network based on a communication standard, such as WiFi, 2G, or 3G, or a combination thereof. In one exemplary embodiment, the communication component 1108 receives a broadcast signal or broadcast associated information from an external broadcast management system via a broadcast channel. In one exemplary embodiment, the communication component 1108 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1102, executable by the processor 1109 in the apparatus 1100, for performing the above-described methods. For example, the non-transitory computer-readable storage medium may be a ROM, a RAM, a CD-ROM, a magnetic tape, a floppy disc, an optical data storage device, and the like.

Wherein, when instructions in the storage medium are executed by a processor of a smart device, the smart device is enabled to perform a method for binding with the device, including:
receiving a binding request sent by a local terminal, the binding request carrying a registered user ID of the local terminal;
judging whether the binding request is sent from a present local area network;
when the binding request is sent from the present local area network, sending the binding request to a server for the server to establish a binding relationship between the registered user ID and the device; and
after the binding relationship is established, receiving a notification message sent by the server for informing the binding relationship has been established, and forwarding the notification message to the local terminal.

Wherein, when instructions in the storage medium are executed by a processor of a mobile terminal, the mobile terminal is enabled to perform a method for binding with a device, including:
sending a binding request to the to-be-bound device in a present local area network, the binding request carrying a registered user ID of the terminal;
receiving a notification message forwarded by the to-be-bound device, for informing a binding relationship between the registered user ID and the to-be-bound device has been properly established, the notification message being sent by a server after the to-be-bound device sends the binding request to the server and the server has properly established the binding relationship.

It is noted that the various modules in the present disclosure can be implemented using any suitable technology. In an example, a module can be implemented in integrated circuits (IC). In another example, a module can be implanted as processing circuitry executing software instructions.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for binding a user with a device within a present local area network, comprising:
receiving, at the device, a binding request sent by a terminal device, the binding request carrying a registered user identification (ID) that is used by the user to log into a client program on the terminal device, wherein the binding request is transmitted from the terminal device to the device within the present local area network,
wherein the present local area network uses a User Datagram Protocol (UDP) service as a transmission service, and receiving, at the device, the binding request sent by the terminal device further comprises:
determining whether the client program has configured a port number of a UDP port in advance;
when it is determined that the port number of the UDP port is configured by the client program in advance:
monitoring a UDP port; and
acquiring the binding request sent by the terminal device in the present local area network to the device based on a locally preset port number of the UDP port;
when it is determined that the port number of the UDP port is not configured by the client program in advance:
broadcasting a port number of a UDP port opened by the UDP service through the present local area network;
monitoring the UDP port; and
acquiring the binding request sent by the terminal device in the present local area network to the device based on the port number of the UDP port;
acquiring, within the present local area network, an Internet protocol (IP) address of a gateway and a subnet mask of the present local area network;

determining, within the present local area network, the IP network segment of the present local area network based on the IP address of the gateway and the subnet mask;

matching, within the present local area network, an IP address of the binding request with the IP network segment of the present local area network;

determining, within the present local area network, whether the binding request is sent from the present local area network in which the device is connected based on the matching;

when the binding request is sent from the present local area network, sending the binding request to a server, which is located outside of the present local area network, for the server to establish a binding relationship between the registered user ID and the device;

after the binding relationship is established, receiving a notification message transmitted by the server for informing that the binding relationship has been established; and forwarding, within the present local area network, the notification message to the terminal device, wherein when the device is one or a plurality of smart devices in the present wireless local area network with which the user is capable of binding, the binding request is configured to include a hardware address of the device to distinguish the device from other devices of the plurality of smart devices.

2. The method of claim 1, wherein the method further comprises:

when the binding request is sent from a network other than the present local area network, discarding or rejecting the binding request.

3. The method of claim 1, wherein determining whether the binding request is sent from the present local area network further comprises:

when the IP address of the binding request matches with the IP network segment of the present local area network, determining that the binding request is sent from the present local area network; and when the IP address of the binding request does not match with the IP network segment of the present local area network, determining that the binding request is sent from a network other than the present local area network.

4. The method of claim 1, wherein the binding relationship is established when the binding request is transmitted only within the present local area network.

5. The method of claim 4, wherein establishing the binding relationship when the binding request is transmitted only within the present local area network is configured to avoid leakage of the registered user ID and an incorrect binding due to the leakage.

6. An apparatus for binding a user with the apparatus within a present local area network, comprising:

a processor; and a memory for storing instructions executable by the processor;

wherein the processor is configured to perform:

receiving a binding request sent by a terminal device, the binding request carrying a registered user identification (ID) that is used by the user to log into a client program on the terminal device, wherein the binding request is transmitted from the terminal device to the apparatus within the present local area network, wherein the present local area network uses a User Datagram Protocol (UDP) service as a transmission service, and receiving, at the apparatus, the binding request sent by the terminal device further comprises:

determining whether the client program has configured a port number of a UDP port in advance;

when it is determined that the port number of the UDP port is configured by the client program in advance:

monitoring a UDP port; and acquiring the binding request sent by the terminal device in the present local area network to the apparatus based on a locally preset port number of the UDP port;

when it is determined that the port number of the UDP port is not configured by the client program in advance:

broadcasting a port number of a UDP port opened by the UDP service through the present local area network;

monitoring the UDP port; and acquiring the binding request sent by the terminal device in the present local area network to the apparatus based on the port number of the UDP port;

acquiring, within the present local area network, an Internet protocol (IP) address of a gateway and a subnet mask of the present local area network;

determining, within the present local area network, the IP network segment of the present local area network based on the IP address of the gateway and the subnet mask;

matching, within the present local area network, an IP address of the binding request with the IP network segment of the present local area network;

determining, within the present local area network, whether the binding request is sent from the present local area network in which the apparatus is connected based on the matching;

when the binding request is sent from the present local area network, sending the binding request to a server, which is located outside of the present local area network, for the server to establish a binding relationship between the registered user ID and the apparatus;

after the binding relationship is established, receiving a notification message transmitted by the server for informing that the binding relationship has been established; and forwarding, within the present local area network, the notification message to the terminal device, wherein when the apparatus is one or a plurality of smart devices in the present wireless local area network with which the user is capable of binding, the binding request is configured to include a hardware address of the apparatus to distinguish the apparatus from other devices of the plurality of smart devices.

7. The apparatus of claim 6, wherein the processor is further configured to perform:

when the binding request is sent from a network other than the present local area network, discarding or rejecting the binding request.

8. The apparatus of claim 6, wherein the processor is further configured to perform:

when the IP address of the binding request matches with the IP network segment of the present local area network, determining that the binding request is sent from the present local area network; and when the IP address of the binding request does not match with the IP network segment of the present local area network, determining that the binding request is sent from a network other than the present local area network.

9. A non-transitory computer-readable storage medium storing instructions for causing a processor of a device to execute operations for binding a user with the device within a present local area network, the operations comprising:

receiving a binding request sent by a terminal device, the binding request carrying a registered user ID that is used by the user to log into a client program on the terminal device, wherein the binding request is transmitted from the terminal device to the device within the present local area network, wherein the present local area network uses a User Datagram Protocol (UDP) service as a transmission service, and receiving, at the device, the binding request sent by the terminal device further comprises:
determining whether the client program has configured a port number of a UDP port in advance;
when it is determined that the port number of the UDP port is configured by the client program in advance:
monitoring a UDP port; and
acquiring the binding request sent by the terminal device in the present local area network to the device based on a locally preset port number of the UDP port;
when it is determined that the port number of the UDP port is not configured by the client program in advance:
broadcasting a port number of a UDP port opened by the UDP service through the present local area network;
monitoring the UDP port; and
acquiring the binding request sent by the terminal device in the present local area network to the device based on the port number of the UDP port;

acquiring, within the present local area network, an Internet protocol (IP) address of a gateway and a subnet mask of the present local area network;

determining, within the present local area network, the IP network segment of the present local area network based on the IP address of the gateway and the subnet mask;

matching, within the present local area network, an IP address of the binding request with the IP network segment of the present local area network;

determining, within the present local area network, whether the binding request is sent from the present local area network in which the device is connected based on the matching;

when the binding request is sent from the present local area network, sending the binding request to a server, which is located outside of the present local area network, for the server to establish a binding relationship between the registered user ID and the device;

after the binding relationship is established, receiving a notification message transmitted by the server for informing that the binding relationship has been established; and forwarding, within the present local area network, the notification message to the terminal device, wherein when the device is one or a plurality of smart devices in the present wireless local area network with which the user is capable of binding, the binding request is configured to include a hardware address of the device to distinguish the device from other devices of the plurality of smart devices.

10. The non-transitory computer-readable storage medium of claim 9, wherein the operations further comprise:
when the binding request is sent from a network other than the present local area network, discarding or rejecting the binding request.

11. The non-transitory computer-readable storage medium of claim 9, wherein the operation of determining whether the binding request is sent from the present local area network comprises:
when the IP address of the binding request matches with the IP network segment of the present local area network, determining that the binding request is sent from the present local area network; and
when the IP address of the binding request does not match with the IP network segment of the present local area network, determining that the binding request is sent from a network other than the present local area network.

* * * * *

UNITED STATES PATENT AND TRADEMARK OFFICE
CERTIFICATE OF CORRECTION

PATENT NO. : 10,560,491 B2
APPLICATION NO. : 15/012310
DATED : February 11, 2020
INVENTOR(S) : Yuanbo Wang et al.

It is certified that error appears in the above-identified patent and that said Letters Patent is hereby corrected as shown below:

On the Title Page

Item (30), the Foreign Application Priority Data has been omitted. Item (30) should read:
--(30) Foreign Application Priority Data
Feb. 5, 2015 (CN)......................... 201510061349.0--

Signed and Sealed this
Twenty-fourth Day of March, 2020

Andrei Iancu
*Director of the United States Patent and Trademark Office*